United States Patent [19]
Graeber

[11] 3,990,218
[45] Nov. 9, 1976

[54] HARVESTER WITH AUTOMATIC ROCK DETECTOR AND REMOVER

[75] Inventor: Ewald Graeber, Weiterdingen, Germany

[73] Assignee: Maschinenfabrik Fahr Aktiengesellschaft, Gottmadingen, Germany

[22] Filed: Apr. 24, 1975

[21] Appl. No.: 571,431

[30] Foreign Application Priority Data
Apr. 25, 1974 Germany............................ 2419942

[52] U.S. Cl.................................... 56/10.2; 56/10.3
[51] Int. Cl.²......................................... A01D 75/18
[58] Field of Search.................. 56/10.2, 10.3, 10.4, 56/158, 207, 14.4, 257, 264, 296, 309, 310, 311, DIG. 15, 17.4

[56] References Cited
UNITED STATES PATENTS

| | | | |
|---|---|---|---|
| 2,589,553 | 3/1952 | Kesselring | 56/257 |
| 2,720,743 | 10/1955 | Prather | 56/207 |
| 2,750,727 | 6/1956 | Wright | 56/DIG. 15 |
| 3,286,448 | 11/1966 | Moore | 56/DIG. 15 |
| 3,412,535 | 11/1968 | Drummond | 56/14.4 |
| 3,623,301 | 11/1971 | Hofer | 56/10.4 |
| 3,866,400 | 2/1975 | May | 56/158 |

*Primary Examiner*—Louis G. Mancene
*Assistant Examiner*—James D. Hamilton
*Attorney, Agent, or Firm*—Karl F. Ross; Herbert Dubno

[57] ABSTRACT

A harvester has an apron on whose leading edge is provided a sickle bar. Immediately behind and parallel to this sickle bar there is provided a flexible tube having at its front edge a lip connected to the apron and at its rear edge a lip connected to a horizontally extending throw-off member. Inside the tube there is provided a pair of parallel metal strips which on, compression of the tube, close a circuit that generates a signal. This signal may be employed to warn the operator that a rock rests on the apron or may serve to stop the mower and/or reverse the crop feeder. In addition an automatic flipper is provided to pivot the throw-off member secured to the rear lip of the tube so as to automatically to flip the picked-up foreign body off the apron.

16 Claims, 4 Drawing Figures

HARVESTER WITH AUTOMATIC ROCK DETECTOR AND REMOVER

FIELD OF THE INVENTION

The present invention relates to a crop harvester. More particularly this invention concerns a harvester safety apparatus which serves to prevent the harvester from picking up foreign bodies such as rocks or the like.

BACKGROUND OF THE INVENTION

A crop harvester having an apron whose leading edge is provided with a sickle bar is particularly liable to damage when a plowed-up rock or the like is scooped up by the apron and finds its way into the crop feed. It is necessary that the operator of the harvester pay very careful attention to the sickle bar in order that the apparatus may be stopped and any such picked-up foreign body can be removed before it does any damage to the machine. Should such a rock find its way into the mechanism it can seriously damage the machine, creating considerable expense and undesirable down time.

Devices are known which are provided immediately in back of the sickle bar and which have a pair of downwardly concave parallel members extending parallel to the sickle bar. These members hold stones and other foreign bodies back temporarily so that they are not immediately ingested by the machine. The operator must keep a careful watch in order to see these foreign bodies before they work past the members. Such an arrangement is effective under normal operating conditions; however, if the light is poor, there is considerable dust, or the operator is not paying attention, it is possible for a stone to work its way into the apparatus and damage it.

OBJECTS OF THE INVENTION

It is therefore an object of the present invention to provide an improved method and apparatus for preventing foreign bodies such as rocks from finding their way into the mechanism of the harvester.

Yet another object is the provision of such a device which does not rely on the watchfulness of the operator, but which instead frees him from the task of constantly surveying the sickle bar so that other aspects of the harvesting operation may also be attended to.

SUMMARY OF THE INVENTION

These objects are attained according to the present invention by providing in back of the sickle bar a horizontally elongated tubular body extending parallel to the sickle bar and provided with at least one transmission element. The body is so constructed that, when it is compressed, means connected to the transmission element generates a signal. This signal may be employed to sound or light a warning for the operator, or may be connected to means which automatically serves to reject the foreign body from the apron of the harvester.

In accordance with a feature of this invention the hollow body is an elastomeric tube of normally oval cross section provided on the inside of its upper wall a longitudinally extending conductive metal strip and with a similar metal strip on its lower wall. When compressed the two metal strips contact each other switch-fashion and close a circuit.

In accordance with another feature of this invention the transmission element can be a medium such as air, or liquid whose pressure is increased on compression of the body so as to operate a pressure-sensitive switch.

According to a further feature of this invention the body is filled with a plurality of small balls which, when the body is compressed, press against a spring-loaded normally open switch and close it. These balls are staggered within the tube so that when the tube is compressed some of them are put directly in line behind others so as to increase the overall length of the mass of balls in the tube.

In accordance with yet another feature of this invention the tube is provided at its front edge with a forwardly projecting and horizontally extending lip that is secured to the apron immediately in back of the sickle bar. Another such lip is formed at the rear end of the tube and is connected to a downwardly concave and horizontally extending member that is itself generally parallel to the sickle bar. This member can pivot using the tubular member as a hinge. Thus should a body compress the tube and therefore be detected this member can be swung up to throw the body off. The operator himself may do the pivoting, may actuate means for pivoting, or automatic means may be provided for pivoting the throw-off member up on detection of a foreign body.

According to a further feature of the present invention the signal generated on compression of the tubular sensor body can be used to stop the displacement of the harvester along the ground. This signal may additionally or alternatively be used to stop or reverse the feed means that automatically draws the cut crop from the sickle bar back into the harvester. Similarly it is advantageous according to the present invention if the entire apron of the machine is automatically lifted when a foreign body is sensed so that when this body is thrown off it is not immediately picked up again.

In the apparatus according to the present invention the possibility that a foreign body such as a potentially dangerous rock or the like can find its way into the mechanism of the apparatus is almost entirely ruled out. The operator is immediately signaled when the foreign body is picked up, and automatic means may be provided to reject it without even requiring his intervention. The device is relatively simple and foolproof and the detector can have relatively low sensitivity so that only foreign bodies which could be potentially harmful to the machine are detected, whereas the relatively light crop falling over the sensor body does not close the circuit and release the signal.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
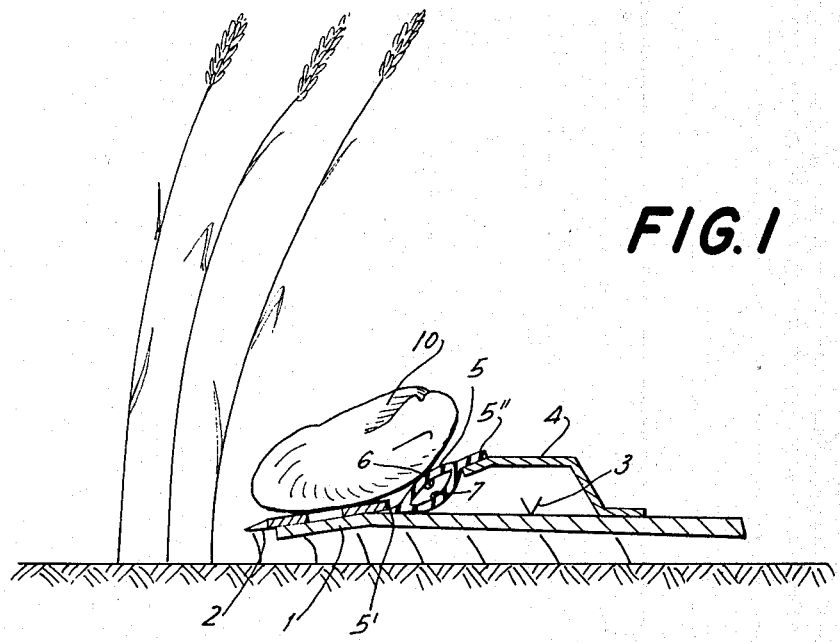
FIG. 1 is a vertical section through the apparatus according to the present invention.
Figure 2:
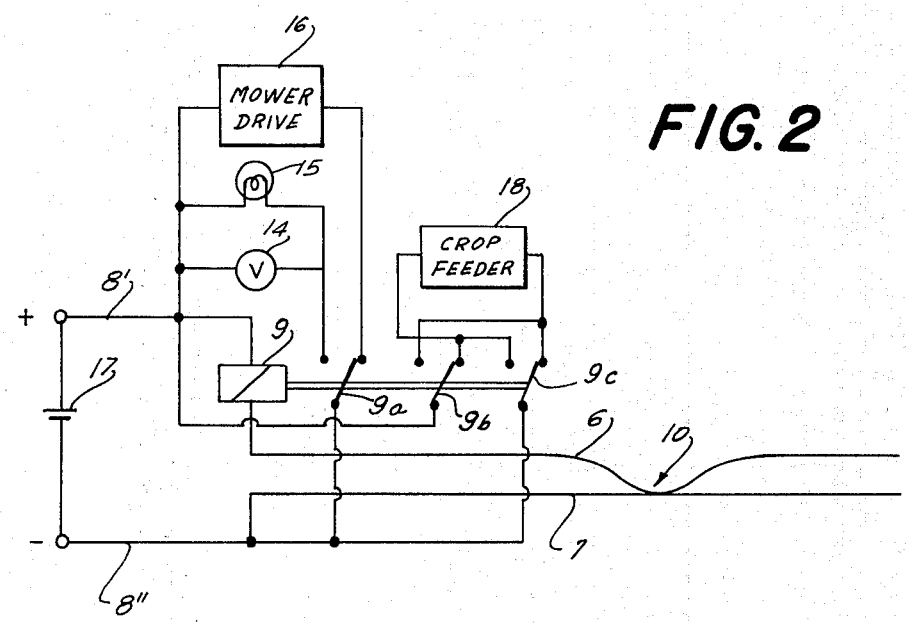
FIG. 2 is a schematic view illustrating operation of the device of FIG. 1.

As shown in FIGS. 1 and 2 the harvester has a horizontally extending beam 1 provided at its front edge with a sickle bar 2 and forming an apron 3 in back of the sickle bar 2. A generally downwardly concave and horizontally elongated metal member 4 overlies the apron 3 and extends generally parallel to the sickle bar 2. Similarly arranged parallel to the sickle bar 2 is an elastomeric tube 5 which has a front lip 5' secured to the apron 3 and a rear lip 5'' secured to the member 4. This tube is provided on its upper wall with a longitudinally extending conducting metal strip 6 and on its lower wall with a longitudinally extending metal strip 7. Conductors 8' and 8'' connected to opposite sides of a voltage source 17 are connected to these conductor strips 6 and 7. As shown in FIG. 2 a relay 9 having three poles 9a, 9b, and 9c is also connected across the power supply 17 and between the conductor 8' and the strip 6.

When as shown in FIG. 1 a rock 10 or a similarly heavy foreign body comes to rest on top of and compresses the tube 5 the two strips 6 and 7 come into contact with each other. This acts switch-fashion to form a closed circuit that operates the relay 9. The pole 9a lights a lamp 15 visible by the operator of the harvester and closes a hydraulic valve 14. In addition the pole 9a disconnects the motor drive 16 so as to stop the harvester's forward advance along the ground. The poles 9b and 9c are connected so that on actuation they reverse the direction of operation of the crop feeder 18 of the harvester so that the rock is already caught in the mechanism pulling the cut crop back into the mechanism of the harvester it will automatically be pushed forward again.

Figure 3:
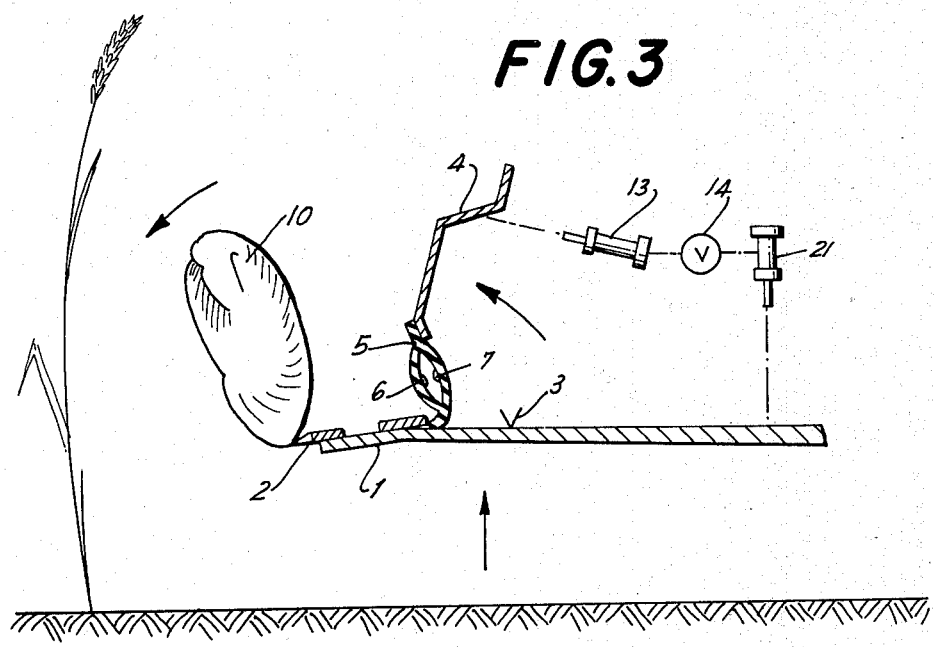
FIG. 3 is a view similar to FIG. 1 illustrating functioning of the apparatus.

As shown in FIG. 3 the member 4 is only connected to the apron 3 by means of the flexible tube 5 which therefore acts as a hinge. In addition a hydraulic cylinder 13 operated by the valve 14 can serve to pivot this member 4 upwardly as shown in FIG. 3. Another cylinder 21 connected to the valve 14 serves to raise the entire beam 1. Thus the rock is flipped forward off the apron 3 while at the same time the beam 1 is raised so that when mowing is resumed the rock 10 will not be picked up again.

The mower feed according to the present invention may comprise a pair of combs as described in my earlier U.S. Pat. No. 3,550,362 issued 29 Dec. 1970, or may have a pair of forwardly converging augers as is common in corn harvesters and the like.

Figure 4:
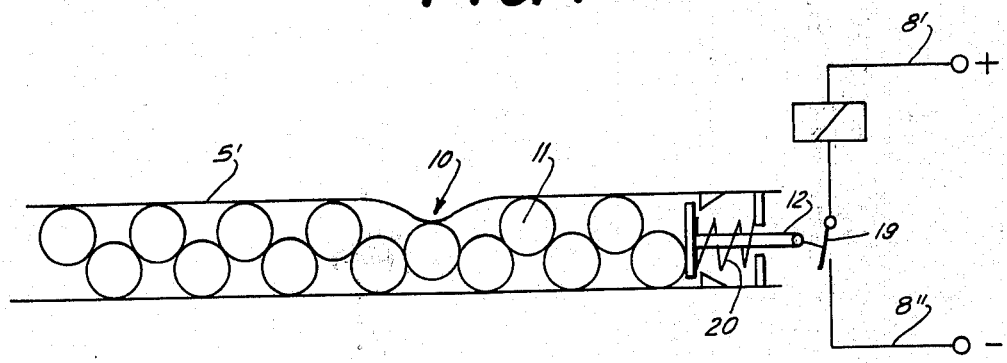
FIG. 4 is a schematic view illustrating another switch arrangement according to the present invention.

The arrangement shown in FIG. 4 is similar to that shown in FIGS. 1–3, except that the tubes 5' here is filled with a mass of staggered balls 11. At one end the tube is closed and at the other end it is provided with a plunger 12 normally pressed into the tube by a spring 20. When a rock lies on the tube 5' it forces at least one of the balls down between the two adjacent balls and thereby increases the overall length of the mass of balls 11. This action pushes the plunger 12 down against the force of its spring and closes a switch 19 that operates the relay 9. It is also possible in this apparatus to fill the tube with liquid instead of the balls 11 and in this manner operate the plunger 12.

I claim:

1. In combination with a crop harvester having a front apron provided at its leading edge with a sickle bar, a safety apparatus comprising:
    an elongated and hollow flexible body on said apron directly behind said sickle bar,
    at least one transmission element in said body, and
    means connected to said element for generating an output signal when said body is compressed by a foreign body, said element being a relatively noncompressible mass formed of a multiplicity of noncompressible balls in said body and said means including a switch closable on compression of said mass.

2. The apparatus defined in claim 1, further comprising an elongated profiled member extending generally parallel to said sickle bar behind said element, and means for pivoting said member about an axis in front of said member to throw said foreign body off said apron.

3. The apparatus defined in claim 2 wherein said element has a forwardly projecting and horizontally extending lip secured to said apron and a rearwardly projecting and horizontally extending lip secured to said member.

4. The apparatus defined in claim 3 wherein said member is downwardly concave.

5. The apparatus defined in claim 4, further comprising means operable by said signal for pivoting said member about said axis on generation of said signal.

6. The apparatus defined in claim 1 wherein said harvester is provided with means for advancing cut crop backwardly from said leading edge, said apparatus further comprising means operable by said signal for reversing said means for advancing and thereby displacing said foreign body toward said leading edge.

7. The apparatus defined in claim 1 wherein said harvester is provided with drive means for displacing itself along the ground, said apparatus further comprising means operable by said signal and connected to said drive means for stopping said harvester on generation of said signal.

8. In combination with a crop harvester having a front apron provided at its leading edge with a sickle bar, a safety apparatus comprising:
    an elongated and hollow-wall flexible tube on said apron directly behind said sickle bar,
    at least one force-transmission element in said tube displaceable upon the compression of said tube thereby at any point along its length by a stone, and
    means connected to said element for generating an output signal when said tube is compressed by a stone.

9. The apparatus defined in claim 1 wherein a pair of generally parallel and spaced apart contacts are provided of conductive material along opposite internal walls of said tube, said contacts constituting said element and forming a switch closable on compression of said tube.

10. The apparatus defined in claim 1 wherein said element is a relatively noncompressible mass and said means includes a switch closable on compression of said mass.

11. The apparatus defined in claim 1, further comprising an elongated profiled member extending generally parallel to said sickle bar behind said tube, and means for pivoting said tube and said member about an axis in front of said tube to throw said stone off said apron.

12. The apparatus defined in claim 11 wherein said element has a forwardly projecting and horizontally tube lip secured to said apron and a rearwardly projecting and horizontally extending lip secured to said member.

13. The apparatus defined in claim 12 wherein said member is downwardly concave.

14. The apparatus defined in claim 13, further comprising means operable by said signal for pivoting said member about said axis on generation of said signal.

15. The apparatus defined in claim 1 wherein said harvester is provided with means for advancing cut crop backwardly from said leading edge, said apparatus further comprising means operable by said signal for reversing said means for advancing and thereby displacing said foreign body toward said leading edge.

16. The apparatus defined in claim 1 wherein said harvester is provided with drive means for displacing itself along the ground, said apparatus further comprising means operable by said signal and connected to said drive means for stopping said harvester on generation of said signal.

* * * * *